(12) United States Patent
Matzkel et al.

(10) Patent No.: US 10,313,371 B2
(45) Date of Patent: Jun. 4, 2019

(54) SYSTEM AND METHOD FOR CONTROLLING AND MONITORING ACCESS TO DATA PROCESSING APPLICATIONS

(75) Inventors: Ben Matzkel, Givatayim (IL); Maayan Tal, Be'er Sheva (IL); Aviad Lahav, Tel-Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 1591 days.

(21) Appl. No.: 13/111,572

(22) Filed: May 19, 2011

(65) Prior Publication Data

US 2011/0314088 A1 Dec. 22, 2011

Related U.S. Application Data

(60) Provisional application No. 61/347,230, filed on May 21, 2010.

(51) Int. Cl.
*H04L 29/06* (2006.01)
*H04L 29/08* (2006.01)

(52) U.S. Cl.
CPC ...... *H04L 63/1425* (2013.01); *H04L 63/0884* (2013.01); *H04L 67/2804* (2013.01)

(58) Field of Classification Search
CPC ............. H04L 63/1425; H04L 63/0884; H04L 67/2804
USPC ........................................................ 370/203
See application file for complete search history.

(56) References Cited

U.S. PATENT DOCUMENTS

| 5,333,266 | A | 7/1994 | Boaz et al. |
| 5,537,586 | A | 7/1996 | Amram et al. |
| 5,585,793 | A | 12/1996 | Antoshenkov et al. |
| 5,659,737 | A | 8/1997 | Matsuda |
| 5,870,084 | A | 2/1999 | Kanungo et al. |
| 5,958,006 | A | 9/1999 | Eggleston et al. |
| 6,128,735 | A | 10/2000 | Goldstein et al. |
| 6,334,140 | B1 | 12/2001 | Kawamata |
| 6,492,917 | B1 | 12/2002 | Goel et al. |
| 6,523,063 | B1 | 2/2003 | Miller et al. |
| 6,678,694 | B1 | 1/2004 | Zimmermann et al. |
| 6,961,849 | B1 | 11/2005 | Davis et al. |
| 7,155,442 | B2 | 12/2006 | Carlin et al. |

(Continued)

FOREIGN PATENT DOCUMENTS

| EP | 1 633 108 | 3/2006 |
| GB | 2 349 960 | 11/2000 |

(Continued)

OTHER PUBLICATIONS

Raykova et al., "Secure Anonymous Database Search", CCSW'09, Nov. 13, 2009, pp. 115-126.

(Continued)

*Primary Examiner* — Jenee Holland
(74) *Attorney, Agent, or Firm* — Finnegan, Henderson, Farabow, Garrett & Dunner, LLP

(57) ABSTRACT

A system and method for auditing data. A first request, the request including at least one data item and generated at a client may be received. The at least one data item may be processed to produce at least one processed data item. A second request may be generated based on the first request and on the processed data items. The second request may be forwarded to a server.

24 Claims, 3 Drawing Sheets

(56) References Cited

U.S. PATENT DOCUMENTS

| | | |
|---|---|---|
| 7,165,175 B1 | 1/2007 | Kollmyer et al. |
| 7,426,752 B2 | 9/2008 | Agrawal et al. |
| 7,580,980 B2 | 8/2009 | Kawashima et al. |
| 7,685,083 B2 | 3/2010 | Fairweather |
| 7,873,840 B2 | 1/2011 | Agrawal et al. |
| 7,895,666 B1 | 2/2011 | Eshghi et al. |
| 7,953,736 B2 | 5/2011 | Rinearson et al. |
| 8,065,308 B2 | 11/2011 | Shadmon et al. |
| 8,225,107 B2 | 7/2012 | Chang et al. |
| 8,316,237 B1* | 11/2012 | Felsher .............. H04L 9/0825 380/282 |
| 2001/0037454 A1 | 11/2001 | Botti et al. |
| 2001/0044893 A1 | 11/2001 | Skemer |
| 2002/0026475 A1* | 2/2002 | Marmor ................... 709/203 |
| 2002/0046253 A1 | 4/2002 | Uchida et al. |
| 2002/0073099 A1 | 6/2002 | Gilbert et al. |
| 2002/0143521 A1 | 10/2002 | Call |
| 2002/0184336 A1* | 12/2002 | Rising, III ............. 709/217 |
| 2002/0199096 A1 | 12/2002 | Wenocur et al. |
| 2003/0007637 A1 | 1/2003 | Banks |
| 2003/0033357 A1* | 2/2003 | Tran et al. .............. 709/203 |
| 2003/0081784 A1 | 5/2003 | Kallahalla et al. |
| 2003/0163691 A1 | 8/2003 | Johnson |
| 2003/0200332 A1* | 10/2003 | Gupta et al. ............. 709/238 |
| 2004/0122907 A1* | 6/2004 | Chou et al. ............. 709/207 |
| 2004/0260694 A1 | 12/2004 | Chaudhuri et al. |
| 2005/0015513 A1* | 1/2005 | Tran et al. .............. 709/246 |
| 2005/0060372 A1 | 3/2005 | DeBettencourt et al. |
| 2005/0147240 A1 | 7/2005 | Agrawal et al. |
| 2005/0157871 A1 | 7/2005 | Komano et al. |
| 2005/0165623 A1 | 7/2005 | Landi et al. |
| 2005/0165790 A1* | 7/2005 | Seliger ............... G06F 21/6218 |
| 2005/0198170 A1 | 9/2005 | LeMay et al. |
| 2005/0226424 A1 | 10/2005 | Takata et al. |
| 2005/0235163 A1 | 10/2005 | Forlenza et al. |
| 2005/0283533 A1* | 12/2005 | Schluter et al. .......... 709/228 |
| 2006/0005017 A1 | 1/2006 | Black et al. |
| 2006/0041533 A1 | 2/2006 | Koyfman |
| 2006/0101285 A1 | 5/2006 | Chen et al. |
| 2006/0143237 A1 | 6/2006 | Peterson et al. |
| 2006/0170544 A1 | 8/2006 | Hahn et al. |
| 2006/0182138 A1* | 8/2006 | Kamiya ................... 370/452 |
| 2006/0224687 A1* | 10/2006 | Popkin et al. ............ 709/217 |
| 2006/0251246 A1 | 11/2006 | Matsui |
| 2007/0038579 A1 | 2/2007 | Ansley |
| 2007/0100913 A1 | 5/2007 | Sumner et al. |
| 2007/0124471 A1* | 5/2007 | Harada et al. ........... 709/225 |
| 2007/0130069 A1 | 6/2007 | Kay et al. |
| 2007/0168656 A1 | 7/2007 | Paganetti et al. |
| 2007/0198206 A1 | 8/2007 | Jagerbrand et al. |
| 2007/0208732 A1 | 9/2007 | Flowers et al. |
| 2007/0234034 A1 | 10/2007 | Leone et al. |
| 2008/0005247 A9 | 1/2008 | Khoo |
| 2008/0034197 A1 | 2/2008 | Engel et al. |
| 2008/0147816 A1 | 6/2008 | Damm et al. |
| 2008/0276098 A1 | 11/2008 | Florencio et al. |
| 2008/0282085 A1 | 11/2008 | Di Giusto et al. |
| 2008/0282096 A1 | 11/2008 | Agrawal et al. |
| 2008/0294711 A1* | 11/2008 | Barber ................ G06Q 30/02 709/201 |
| 2008/0313203 A1 | 12/2008 | Imamura et al. |
| 2009/0113213 A1 | 4/2009 | Park et al. |
| 2009/0113532 A1* | 4/2009 | Lapidous ................ 709/219 |
| 2009/0132362 A1* | 5/2009 | Fisher ................ G06Q 10/06 705/14.47 |
| 2009/0327748 A1 | 12/2009 | Agrawal et al. |
| 2010/0046755 A1 | 2/2010 | Fiske |
| 2010/0083078 A1* | 4/2010 | Asai ................ H04L 67/2823 715/208 |
| 2010/0146299 A1 | 6/2010 | Swaminathan et al. |
| 2010/0161957 A1 | 6/2010 | Chang et al. |
| 2010/0169665 A1 | 7/2010 | Kang et al. |
| 2010/0235307 A1 | 9/2010 | Sweeney et al. |
| 2010/0332502 A1 | 12/2010 | Carmel et al. |
| 2011/0004607 A1 | 1/2011 | Lokam et al. |
| 2011/0055277 A1* | 3/2011 | Resch ................ G06F 11/1004 707/785 |
| 2011/0072489 A1 | 3/2011 | Parann-Nissany |
| 2011/0154053 A1 | 6/2011 | Veret |
| 2011/0167107 A1 | 7/2011 | Matzkel et al. |
| 2011/0208838 A1* | 8/2011 | Thomas et al. ............ 709/219 |
| 2011/0302321 A1* | 12/2011 | Vange ................ G06F 9/5027 709/241 |
| 2012/0023193 A1* | 1/2012 | Eisner et al. ............ 709/217 |
| 2013/0067225 A1 | 3/2013 | Shochet et al. |

FOREIGN PATENT DOCUMENTS

| | | |
|---|---|---|
| JP | 2001-147934 | 5/2001 |
| JP | 2004-101905 | 4/2004 |
| JP | 2005-130352 | 5/2005 |
| JP | 2005-242740 | 9/2005 |
| JP | 2005-284915 | 10/2005 |
| JP | 2007-243650 | 9/2007 |
| JP | 2007-251585 | 9/2007 |
| JP | 2008-301335 | 12/2008 |
| WO | WO 01/47205 | 6/2001 |
| WO | WO 2010/026561 | 3/2010 |
| WO | WO 2010/029559 | 3/2010 |

OTHER PUBLICATIONS

International Search Report for International Application No. PCT/IL2010/001097 dated Sep. 6, 2011.

International Search Report for International Application No. PCT/IL2011/000396 datded Oct. 4, 2011.

International Search Report for PCT/IL09/00901 dated Jan. 14, 2010.

Written Opinion of the International Searching Authority for PCT/IL09/00901 dated Jan. 14, 2010.

International Preliminary Report of Patentability for PCT/IL09/00901 dated Mar. 15, 2011.

Written Opinion of the International Searching Authority for PCT/IL11/00396 dated Oct. 4, 2011.

International Preliminary Report of Patentability for PCT/IL11/00396 dated Dec. 6, 2012.

Written Opinion of the International Searching Authority for PCT/IL10/001097 dated Sep. 6, 2011.

International Preliminary Report of Patentability for PCT/IL10/001097 dated Jul. 12, 2012.

Final Office Action for U.S. Appl. No. 12/982,694 dated Aug. 30, 2013.

Notice of Allowance for U.S. Appl. No. 12/982,694 dated Apr. 1, 2014.

Final Office Action for U.S. Appl. No. 12/982,691 dated Oct. 15, 2013.

Office Action for U.S. Appl. No. 12/982,691 dated Nov. 14, 2014.

Final Office Action for U.S. Appl. No. 12/982,691 dated May 21, 2015.

Notice of Allowance for U.S. Appl. No. 12/982,691 dated Jan. 14, 2016.

Final Office Action for U.S. Appl. No. 12/982,690 dated Oct. 8, 2013.

Notice of Allowance for U.S. Appl. No. 12/982,690 dated Nov. 21, 2014.

Notice of Allowance for U.S. Appl. No. 12/982,690 dated Aug. 13, 2014.

Notice of Allowance for U.S. Appl. No. 12/982,690 dated Feb. 5, 2015.

Notification of Reasons for Rejection for Japanese Application No. 2012-546558 dated Oct. 28, 2014 (and English translation).

Notice of Allowance for Japanese Application No. 2012-546558 dated Mar. 17, 2015 (and English translation).

Final Office Action for U.S. Appl. No. 12/982,695 dated Oct. 9, 2013.

Office Action for U.S. Appl. No. 12/982,695 dated Aug. 25, 2014.

Final Office Action for U.S. Appl. No. 12/982,695 dated Apr. 13, 2015.

Office Action for U.S. Appl. No. 12/982,691 dated Oct. 15, 2013.

(56) References Cited

OTHER PUBLICATIONS

Office Action for U.S. Appl. No. 12/982,688 dated Nov. 29, 2013.
Menezes, Vanstone, Oorschot, "Handbook of Applied Cryptography," 1997, CRC Press LLC, XP002716554 * p. 546-p. 552 *.
Office Action for U.S. Appl. No. 13/063,939 dated Jan. 2, 2013.
Final Office Action for U.S. Appl. No. 13/063,939 dated Sep. 4, 2013.
Office Action for U.S. Appl. No. 13/063,939 dated Jan. 21, 2015.
Final Office Action for U.S. Appl. No. 13/063,939 dated Aug. 19, 2015.
Notice of Allowance for U.S. Appl. No. 13/063,939 dated Feb. 19, 2016.
Supplementary European Search Report and the European Search Opinion for European Patent Application No. 09812787.1 dated Dec. 10, 2013.
Office Action from the Israeli Patent Office for Application No. 211750 dated Sep. 14, 2014.
Office Action for U.S. Appl. No. 13/111,572 dated Jun. 11, 2014.
Final Office Action for U.S. Appl. No. 13/111,572 dated Apr. 1, 2015.
Patent Examination Report for Australian Patent Application No. 2011254219 dated Mar. 19, 2014.
Office Action for U.S. Appl. No. 12/982,695 dated Dec. 11, 2012.
Office Action for U.S. Appl. No. 12/982,690 dated Dec. 17, 2012.
Office Action for U.S. Appl. No. 12/982,691 dated Dec. 17, 2012.
Office Action for U.S. Appl. No. 12/982,694 dated Dec. 7, 2012.
Office Action for U.S. Appl. No. 15/259,542 dated Nov. 16, 2016.
Final Office Action for U.S. Appl. No. 15/259,542 dated May 19, 2017.

* cited by examiner

SYSTEM AND METHOD FOR CONTROLLING AND MONITORING ACCESS TO DATA PROCESSING APPLICATIONS

CROSS-REFERENCE TO RELATED APPLICATIONS

This application claims benefit of US Provisional Patent Application No. 61/347,230, filed May 21, 2010, which is incorporated in its entirety herein by reference.

BACKGROUND OF THE INVENTION

In today's knowledge-based economy, an organization's data is one of its more important assets, and many organizations seek to protect, track, monitor and audit access to their data. Many data-processing applications accordingly offer a set of data tracking capabilities, such as maintaining change history for data records. Change history typically includes the time, responsible user, and a set of data values for every change. Another type of data control is called access control, in which users are allowed or denied read or write access to certain records or record sets.

Modern organizations use multiple data-processing applications, each such application managing a subset of an organization's data. Sometimes such applications offer a set of data management controls, where these data controls usually differ in their interface but generally provide similar functionalities that may be related to similar data management controls or aspects. Moreover, many data processing applications use a user management system in order to supply data access controls to organizations. These user management systems are also different in their interface but provide fundamentally similar functions. Accordingly, an organization may be forced to manage a (possibly large number) of applications in order to enforce data access or management control.

SUMMARY OF EMBODIMENTS OF THE INVENTION

Embodiments of the invention may enable auditing and/or controlling data transactions and/or operations related to data. For example, an embodiment of the invention may audit and/or control operations or data transactions related to writing or modifying data stored in a repository, or read data requests. Operations related to data may be recorded and/or reported. Information in a data transaction, request or a data communication may be modified, and modified information may be stored in a repository. Control information may be added to a modified or processed data transaction or request. A mediator may accept a first request from client and generate a processed request. A mediator may process at least one data item in the first request to produce at least one processed data item, generate a second request based on the first request and on the processed data item and forward the second request to a server, database, application or repository. The mediator may include parameters or information such as control information, one or more identifiers in a processed request. Information in a request may be encoded, transformed, encrypted or otherwise manipulated to generate a processed request. A mediator may decode, decrypt or otherwise process a data communication including a processed data item to produce an unprocessed data item.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
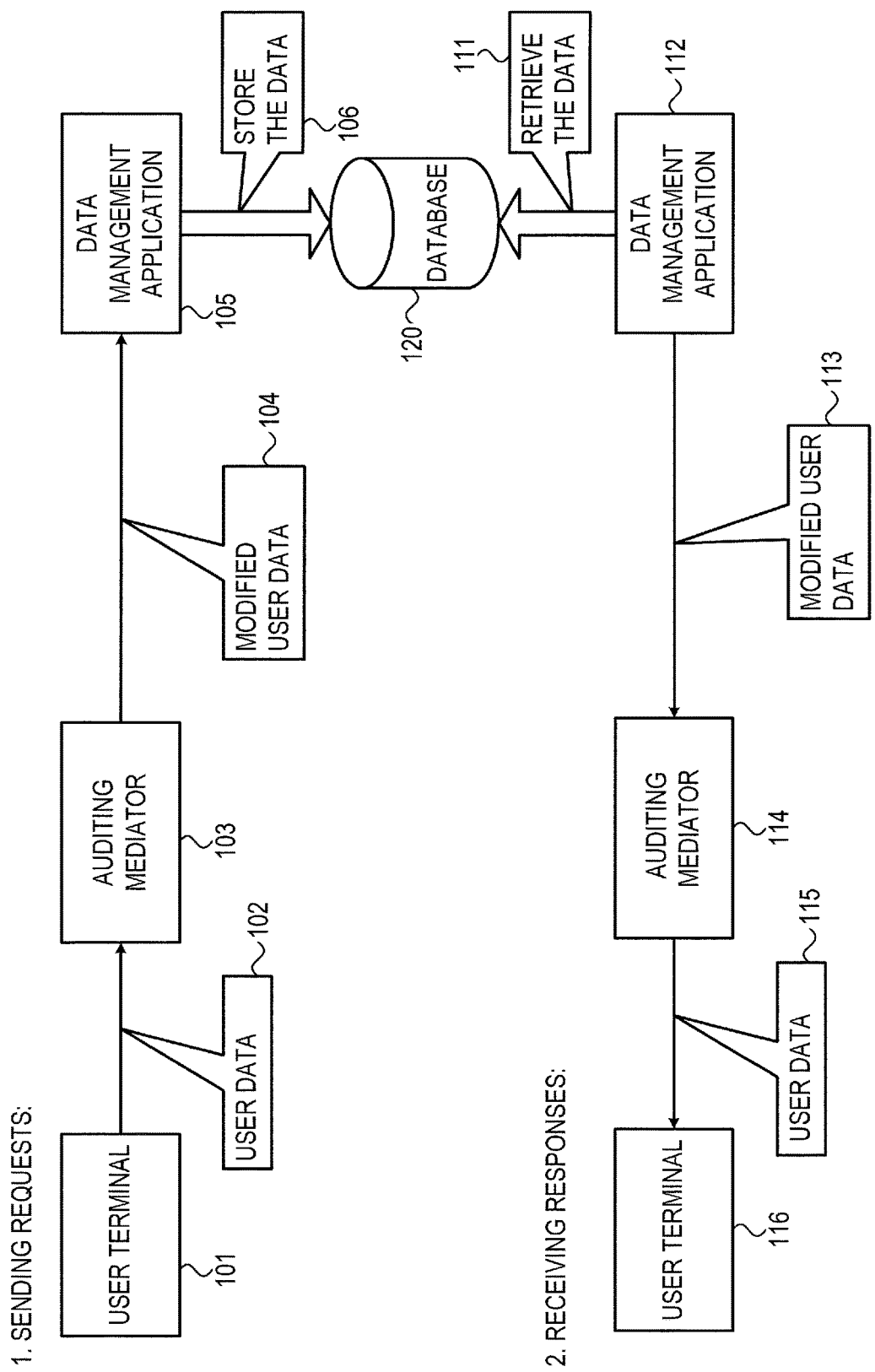
FIG. 1 shows a schematic block diagram of a system and data flow according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. For example, a mediator or components of a mediator may be such article.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Embodiments of the invention may be or may include a unified and coherent system and method for protecting access to data, managing users, enforcing organization policies and monitoring access to data. A system may mediate communication of any data, information or parameters between users and data processing applications, providing controlled and monitored data processing operations, transactions and/or sessions. A system according to the invention may provide a uniform method to manage users, define and enforce or apply data access policies and audit operations related to data, e.g., read and write operations or transactions.

Embodiments of the invention may include a client, a server, a mediator and a retrieval module. A mediator and a retrieval module may be devices including a controller, a non-transitory memory and/or a storage. In some embodiments a mediator and/or a retrieval module may be or may include a software module. In other embodiments, a mediator and/or a retrieval module may be or may include specific or dedicated hardware, software, firmware or any combination thereof. For example, a mediator and/or a retrieval module may be a chip (e.g., installed on a card or board that may be installed in a computing device) including memory, controller and a set of peripheral components.

A server may manage and store data of one or more users. A client may make data processing requests to the server. A mediator may be adapted to intercept, receiving or otherwise obtain requests from the client, process the requests, possibly modify them to produce processed requests, and forward the processed requests to the server. The mediator may receive responses from the server, process them, possibly modify them to produce processed responses, and forward the processed responses to the client. A mediator may generate and/or produce events, reports or other information related to operations related to data (e.g., data access operations). A storage system may store events, reports or other information produced by a mediator. A retrieval module may access a storage system, retrieve events, reports or other information, analyze retrieved data, and provide reports, e.g., to a user. When a mediator processes data to be received by a client, it may be referred to as a reverse mediator.

A client may be a user, e.g., an employee in an organization, or it may be a module or unit, e.g., a computer agent acting on behalf of a human, an agent may be directly controlled, e.g., by a user or it may automatically or independently perform data related operations. For example, a client may be a backup application that writes information to, or modifies information on a backup server. A mediator may be one or more network nodes that may be located between a client and a data management application. A mediator may be a module located at the data processing application, or a module located at the client. A mediator may include two or more portions, components or units that may be geographically or otherwise separated. For example, a first portion of a mediator may be adapted to receive requests or other communications from a client and a second portion of a mediator may be adapted to receive responses or other communications from the server.

FIG. 1 shows a schematic block diagram of a system and related data flows according to embodiments of the invention. As shown, a system may include a client that may be a user terminal 101. client 101 may issue a request to data management application 105. A system may include a mediator 103 to obtain a communication from client 101. Mediator 103 may obtain data communicated from user terminal 101 to data management application 105, process obtained data to produce modified data or transaction and forward the modified data to data management application 105.

A system may include a data management application 112 (that may be the same as data management application 112 or another application) to communicate data (e.g., a response retrieved from database 120) to a client, e.g., user terminal 116 that may be user terminal 101 or may be a different user and/or device. As shown, auditing mediator 103 may process requests or user data 102 received from a client or user terminal 101 to provide processed requests 104, and may forward the processed requests 104 to data management application 105. Auditing mediator 114 may process responses 113 received from a server or application, produce processed responses 115, and may forward the processed responses 115 to a client. Parties to a transaction, e.g., clients, servers and/or applications may not be aware of the presence of the mediator. For example, user terminals 101 and 116 may interact with data management applications 105 and 112 as if mediators 103 and 114 are not involved in the interaction.

Although for the sake of simplicity and clarity, requests and responses are mainly discussed herein, it will be understood that embodiments of the invention are not limited to requests and responses. Any communication of any information, data or parameters between a client and an application or server may be applicable. For example, any information, data or parameters sent from a client to an application or server may be intercepted or otherwise obtained by a mediator, encrypted, transformed, converted or otherwise processed, and the encrypted or otherwise processed information may be forwarded to the server or application, e.g., instead of the original data sent from the client. Similarly, any information, data or parameters sent from a server or application to a client may be obtained, transformed, converted decrypted or otherwise processed and the decrypted or otherwise processed information may be forwarded to the client.

A mediator (e.g., auditing mediator 104) may control communication. For example, a mediator may block a transaction or prevent an operation. For example, mediator 103 may prevent a data write request from being executed, e.g., by not forwarding the request to management application 105 and possibly provide an indication of a prevention of an operation, e.g., to the client issuing the request and/or an administrator. Similarly, a transaction from application 112 to terminal 116 may be blocked by mediator 114.

A request, response, transaction or data communication may contain one or more data items. Processing a transaction, e.g., processing a request or a response by a mediator may include processing the data items. Processing a transaction may be based on content included in the transaction, e.g., in included data items. In case a request is received from a client at a mediator is a data write request containing one or more data items, the mediator may process these data jointly or separately, and may provide processed data items to be included in the processed request. Processing of the data items may include including control information in the processed data items, and may include issuing a data access event specifying details of the request and/or contained data items.

In case a response (destined to a client) is received from a server at a mediator where the response may contain one or more data items, the mediator may process the request by at least one of (a) detecting data items containing control information in the response, (b) processing data items containing control information to provide processed data items, (c) issuing a data access event or indication specifying details of the response and/or contained data items (d) preventing a user from accessing at least a portion of the data contained in the response and (e) providing a modified response to the client and possibly indicating this forbidding.

A mediator may mediate session parameters including authentication parameters between a client and a server or application, e.g., user names, passwords and session identifiers. Mediating session parameters may enable a mediator to protect access to server or application data, enforce access to a server or application only through the mediator, and maintain mediator-related context information such as an identity of the user in the mediator. Mediating session parameters may be performed by encrypting, with a key private to the mediator, user names and passwords sent to a server or application, and session identifiers sent to the client. Control information included in a first transaction may be used in a subsequent or related transaction. For example, control information included in data when processing a data write or store request may be used when the data is received as part of a response, e.g., a response to a data read request.

Control information may be included in a processed transaction and may be used by a mediator when processing data items when these data items appear in responses generated by, or received from a server or application. Control information may include one or more control information items. For example, control information may include one or more of (1) identification of the user related to the data write request, (2) a time and date when the write request is made, (3) an identity of a record being written, (4) an identity of a related record in a mediator, (5) a type of the data record being written, (6) a type of data item being written, (7) an identity of the actual mediator processing the request, (8) an identity of the specific part of the mediator processing the request, such as the network address of a network node in a mediator comprising of a multitude of network nodes, (9) a unique indicator identifying the transaction and the data item collectively, (10) information indicating which and how other control information items are included in the request, (11) an instruction to execute an action when reading a record, may be referred to herein as read-time instruction, (12) any other information derived from the request being made and/or the context of the processing of the request. In some embodiments, control information may be inserted into a transaction originating at a client and destined to a server or application and may be removed from a transaction originating at a server or application and destined to client.

Control information may be appended, prepended, interleaved or otherwise incorporated into a record data item holding textual data. Control information may be marked by using a statistically rare feature or identifier, such as a rare character, to indicate its presence and to make detection of record identifiers in a body of text efficient. Control information may use a certain character set to encode its control information items, such as Base-64 encoding. Control information may be encrypted using a private key or using a pair of private and public keys, in order to prevent unauthorized bodies from generating fake control information and/or from directly examining control information. Control information may be truncated to the maximum length of a textual field, if known, if a processed data item holding the control information and the original data exceeds such a known maximum length, such that a server does not reject the data item. A data item in a transaction may be encrypted, and the control information may be included in a processed encrypted data items. Such encryption may also preserve one or more server-side functionalities such as searching, case-insensitive searching, sorting, etc.

Figure 2:
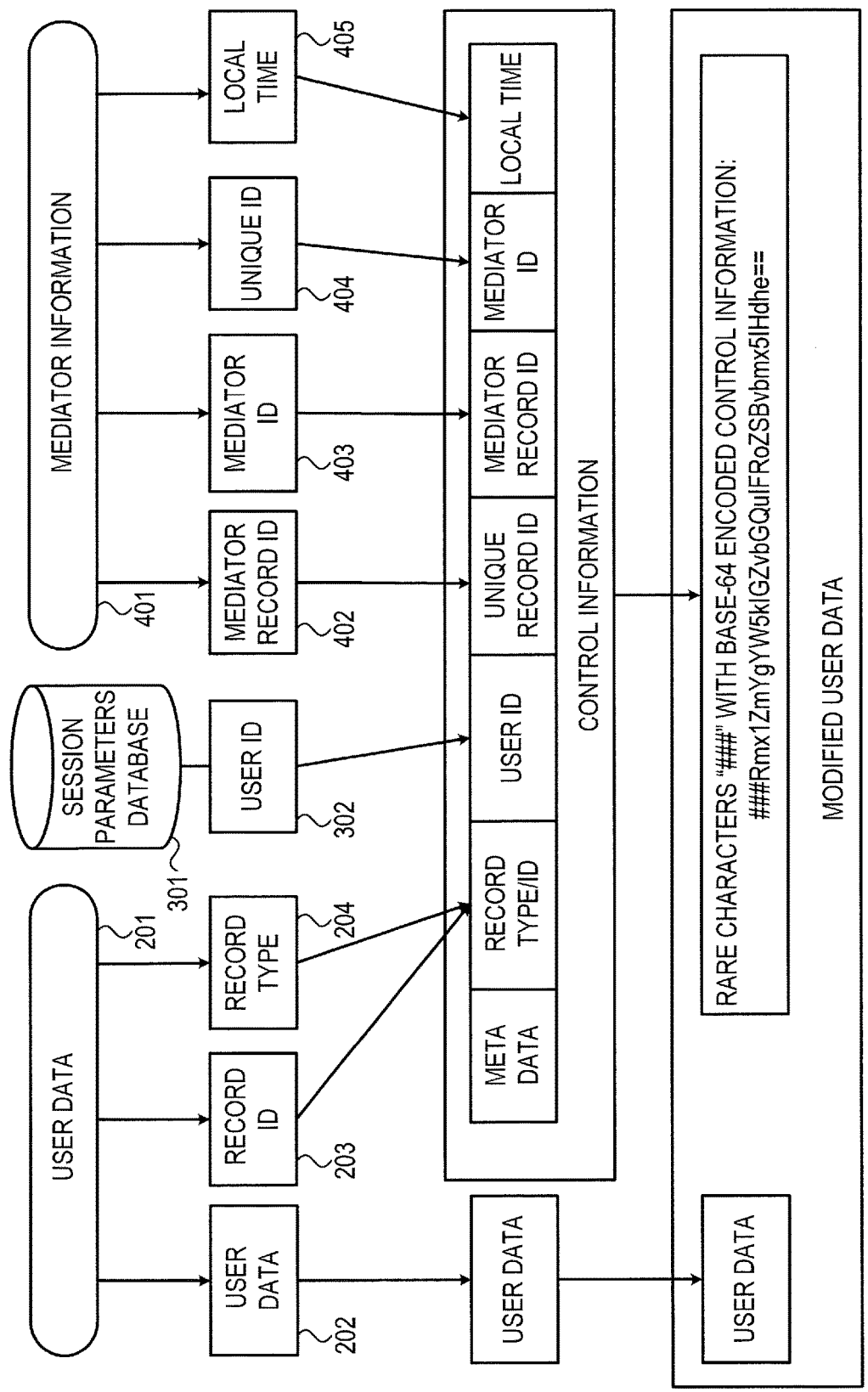
FIG. 2 is a graphical illustration of a method of processing a transaction according to embodiments of the invention.

Reference is made to FIG. 2 that shows a graphical illustration of a method of processing a transaction according to embodiments of the invention. In particular, FIG. 2 illustrates how control information may be generated and incorporated in a transaction. As shown, control information may generated by appending one or more textual characters to a user data item 201, with a rare character sequence "###" indicating the presence of the control information and making its detection in a body of text efficient. The textual characters may encode one or more control information items.

As shown, user data 202 may be included in the modified user data that may be a processed transaction forwarded to a server of application. As further shown, a record identification 203 and record type 204 may be included a control information object. As further shown, a user identification parameter may be incorporated into a control information object. As further shown, a mediator record identification 402, a mediator identification 403, a unique identification parameter 404 and a local time parameter 405 may all be used to generate a control information object. A control information object or record may be encrypted and a predefined string or other parameter (e.g., "###" as shown) may be appended to the encoded control information object, e.g., in order to enable locating the control information object.

As shown, user data 202 may be included in the modified user data that may be a processed transaction forwarded to a server or application. As further shown, a record identification 203 and a record type 204 may be included in a control information object. As further shown, a user identification parameter may be incorporated into a control information object. As further shown, a mediator record identification 402, a mediator identification 403, a unique identification parameter 404 and a local time parameter 405 may all be used to generate a control information object. A control information object or record may be encrypted and a predefined string or other parameter (e.g., "###" as shown) may be appended to the encoded control information object, e.g., in order to enable locating the control information object.

A mediator may correlate data events related to a certain record in a data processing application. Data events may be new record insertion events, existing record update events and record or record data item retrieval events. Since record data items, also referred to herein as record fields, may be retrieved jointly (e.g., when retrieving a certain record) or separately (e.g., when viewing a report), a mediator may add control information to any individual record field when possible.

In order to correlate record events related to a record through the record's lifetime, the mediator may rely on the record identifier in the server. The record identifier by itself may not be sufficient to uniquely identify a record, since a server may have multiple record identifiers of records of different types. For example, in a supply system, record identifier 003 may identify the customer record number 003, and also the shipment record number 003. Thus, the system may use both the type of a record and a record identifier in order to uniquely identify a record, and may include both of them in the control information.

A mediator may also generate its own (possibly temporary) record identifiers and include such temporary record identifier in the control information. Temporary record identifiers may change every time the record is saved. When generating a record identifier, an event may be issued to signal and record the generation of the temporary identifier. When a response is received from a server or application, containing both the temporary identifier and the record identifier in the server, the two identifiers may be correlated and be considered by a mediator to identify the same record.

Temporary record identifiers may be used to correlate a newly created record, having no identifier in the server at the time of creation, to a retrieved record detected in responses generated by the server. When a response from a server includes both the temporary record identifier and the record identifier in the server, an event may be issued relating or associating the two identifiers and this event may be used to relate all accesses to both record's identifiers.

A mediator may be configured to allow (or enable) or disallow (or prevent) certain users from retrieving or manipulating certain records. Information or parameters such as individual record identifiers, certain user identities, the identity of the user who inserted or updated the data, the type of record may be used by a mediator in order to determine whether an operation (e.g., an access to data on a server) is to be enabled or prevented. Controlling operations related to data in a server or application may be based on any parameter that may be included in the control information, or on any combination of parameters described herein, e.g., in order to determine whether the retrieve request is allowed or not. When the control information in a record includes information usable in determining a permission (e.g., whether to permit or prevent a transaction), the mediator may simply check the record information against the context of a request, determine whether the user may receive the related data or not, and act according to an action configured for such cases.

For example, if user A is not allowed to retrieve records entered by user B, and the control information includes identification of user B as the originator of the data, then a request made by user A may be disallowed to complete without change if the response contains record fields entered by user B. A mediator may process a transaction (e.g., a response) according to permissions that may be determined based on information in control information. For example, a mediator may replace the record fields with empty values, with a value indicating forbidden access, or may generate a response indicating that access to some or all record fields is disallowed.

Figure 3:
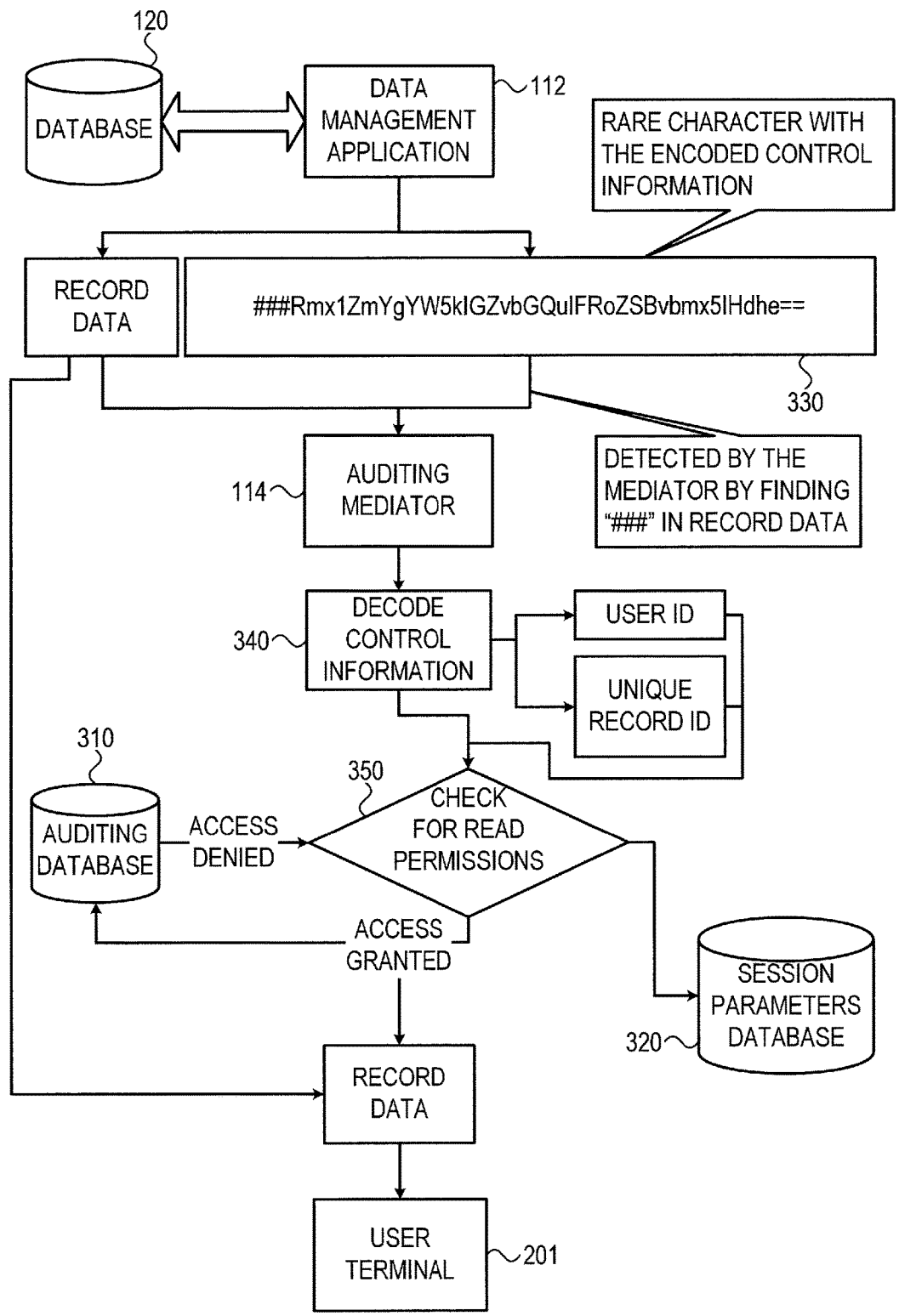
FIG. 3 shows components and related operations according to embodiments of the invention.

Reference is made to FIG. 3 that shows components and related operations according to embodiments of the invention. FIG. 3 illustrates how, in an embodiment of the present invention, tracking read access to data is performed. As shown by 330, determining access rights to data may include detecting control information in user data, e.g., by detecting a predefined string or set of symbols inserted as described herein. As shown by 340, control information may be decoded, for example and as shown, a user identification parameter (user ID) and a unique record identification (unique record ID) may be extracted from the control information. Based on the decoded control information and the user identity, the mediator may grant or deny the user of access to the data, followed by issuing a data read event that may be stored, as shown, in an auditing database 310.

A mediator may be configured to allow or disallow certain users from making write requests including inserting, updating or deleting records. The mediator may use the context in which such a write request are made, including the user identity or identities and the server or application being accessed, and may also use the details of the specific request, such as the record identifier and the original author of the record, in order to determine whether a write request is to be allowed or blocked. The mediator may further use information gathered in previously processed requests and responses in order to make this determination.

For example, a mediator may hold a mapping of known record identifiers in the server to record information such as the original author of the record, the type of the record, the time of writing, or a combination thereof. When a mediator receives a write request to a record identified using a record identifier, the mediator may consult this mapping to obtain the identity of the record's original author, and may determine whether to permit or prevent the operation based on the identity of the original author, information identifying the user attempting to perform the operation, information related to the data being accessed or any parameter that may be obtained by a mediator as described herein.

A retrieval module may receive or gather events generated by a mediator to provide various kinds of reports on the data access. Such reports may include (a) record write history, detailing the users, times, and success indication of write requests to the record, (b) record read history, detailing the users, times and success indication of read requests to the record, (c) a user activity report, detailing read and write requests to certain records made, (d) an author user's data activity report, detailing users, times, and success indication of read and/or write access to an author user's data, (e) reports identifying unordinary behavior and access patterns to data, (f) any other report generating by gathering and analyzing events issued by the mediator.

Embodiments of the invention, e.g., a mediator as described herein, may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. Some embodiments, e.g., a mediator as described herein, may be provided in a computer program product that may include a non-transitory machine-readable medium, stored thereon instructions, which may be used to program a computer, or other programmable devices, to perform methods as disclosed herein.

The storage medium may include, but is not limited to, any type of disk including optical disks, rewritable compact disk (CD-RWs) and the like. The storage medium may include semiconductor devices such as read-only memories (ROMs), random access memories (RAMs), such as a dynamic RAM (DRAM), flash memories or any type of media suitable for storing electronic instructions, including programmable storage devices. A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a workstation, a server computer, a network device or any other suitable computing device.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A system for auditing data, the system comprising:
   a mediator system in communication with a client and a network resource, the mediator system comprising a non-transitory computer readable medium including instructions that, when executed by a first processor, cause the processor to perform operations comprising:
   identifying an original communication generated at said client, said original communication including at least one data item including client data;
   processing said at least one data item to produce at least one first processed data item including control information identifying a record associated with the client data, wherein the record is stored on the network resource;
   generating a modified communication comprising the client data from the original communication and the at least one first processed data item to allow auditing of the processed data item over time; and
   forwarding said modified communication to said network resource.

2. The system of claim 1, wherein the instructions cause the first processor, when processing said at least one data item, to perform at least one of the following:
   include a time indication in said at least one first processed data item;
   include an originator client identity in said at least one first processed data item;
   or include at least one read-time instruction in said at least one first processed data item.

3. The system of claim 1, wherein the instructions cause the first processor, when processing said at least one data item, to encrypt said at least one data item to provide at least one encrypted data item, and encoding said at least one encrypted data item using a textual encoding scheme.

4. The system of claim 1, wherein the instructions cause the first processor, when processing said at least one data item, to include a statistically rare identifier in said at least one first processed data item.

5. The system of claim 1, wherein the instructions cause the first processor, when processing said at least one data item, to truncate said at least one first processed data item to a maximal data item length.

6. The system of claim 1, further including a reverse mediator system, said reverse mediator system comprising a second processor and a memory, the second processor configured to:
   accept a response communication generated at said network resource, said response communication including at least one second processed data item comprising user data and control information identifying a record associated with the client data;
   process said at least one second processed data item to provide at least one unprocessed data item having the control information removed; and
   generate a modified response communication based on said response communication and on said unprocessed data item.

7. The system of claim 6, wherein the second processor, when processing said at least one second processed data item, is configured to generate and provide event information.

8. The system of claim 7, wherein said event information includes at least one of: an originating user identity, a reading user identify, a time of reading of a data item, a time of writing of a data item, and a read-time instruction.

9. The system of claim 6, wherein processing said at least one second processed data item, comprises associating a record identifier included in said at least one second processed data item with a record identifier included in said response communication and storing a parameter related to the associating in a storage system.

10. The system of claim 6, wherein the second processor is configured to prevent an access to the at least one unprocessed data item based on processing the at least one second processed data item.

11. The system of claim 1, wherein processing said at least one data item further comprises deriving auditing information.

12. The system for auditing data of claim 1, wherein the operations further comprise:
    controlling access to the at least one first processed data item based on the control information.

13. A method of auditing data, the method comprising:
    identifying an original communication by a client, said original communication including at least one data item including client data;
    processing said at least one data item to produce at least one first processed data item including control information identifying a record associated with the client data, wherein the record is stored on a network resource; and
    generating a modified communication comprising the client data from the original communication and the at least one first processed data item to allow auditing of the processed data item over time; and
    forwarding said modified communication to the network resource.

14. The method of claim 13, wherein processing at least one data item to provide at least one first processed data item includes at least one of:
    including a time indication in said at least one first processed data item;
    including an originator client identity in said at least one first processed data item;
    or including at least one read-time instruction in said at least one first processed data item.

15. The method of claim 13, wherein processing at least one data item to provide at least one first processed data item includes encrypting said at least one data item to provide at least one encrypted data item, and encoding said at least one encrypted data item using a textual encoding scheme.

16. The method of claim 13, wherein processing at least one data item to provide at least one first processed data item includes including a statistically rare identifier in said at least one first processed data item.

17. The method of claim 13, wherein processing at least one data item to provide at least one first processed data item includes truncating processed data items to a maximal data item length.

18. The method of claim 13, further comprising:
    accepting a response communication generated at said network resource, said response communication including at least one second processed data item comprising client data and control information identifying a record associated with the client data;
    processing said at least one second processed data item to provide at least one unprocessed data item having the control information removed;

generating a modified response communication based on said response communication and on said unprocessed data item.

19. The method of claim 18, wherein processing the at least one second processed data item includes generating and providing event information.

20. The method of claim 19, wherein said event information includes at least one of: an originating client identity, a reading client identity, a time of reading of a data item, a time of writing of a data item, and a read-time instruction.

21. The method of claim 18, wherein processing the at least one second processed data item includes associating a record identifier included in said at least one second processed data item with a record identifier included in said response communication and storing a parameter related to the associating in a storage system.

22. The method of claim 18, further comprising preventing an access to the at least one unprocessed data item based on processing the at least one second processed data item.

23. The system of claim 1, wherein processing said at least one data item further comprises incorporating the control information into said at least one data item to produce at least one first processed data item.

24. The method for auditing data of claim 13, further comprising:
controlling access to the at least one first processed data item based on the control information.

* * * * *